(12) United States Patent
Bauer et al.

(10) Patent No.: US 10,369,523 B2
(45) Date of Patent: Aug. 6, 2019

(54) THERMOFORMING OF FIBER BUNDLES (71) Applicant: GAMBRO LUNDIA AB, Lund (SE)

(72) Inventors: Ulrich Bauer, Hechingen (DE); Karsten Villis, Rottenburg a.N. (DE)

(73) Assignee: Gambro Lundia AB, Lund (SE)

( * ) Notice: Subject to any disclaimer, the term of this patent is extended or adjusted under 35 U.S.C. 154(b) by 376 days.

(21) Appl. No.: 15/303,673

(22) PCT Filed: Apr. 16, 2015

(86) PCT No.: PCT/EP2015/058219
§ 371 (c)(1),
(2) Date: Oct. 12, 2016

(87) PCT Pub. No.: WO2015/158797
PCT Pub. Date: Oct. 22, 2015

(65) Prior Publication Data
US 2017/0028354 A1    Feb. 2, 2017

(30) Foreign Application Priority Data

Apr. 17, 2014 (EP) .................................... 14165145

(51) Int. Cl.
*B01D 61/02* (2006.01)
*B01D 63/02* (2006.01)
*B23P 11/00* (2006.01)
*B01D 61/24* (2006.01)

(52) U.S. Cl.
CPC ......... *B01D 63/021* (2013.01); *B01D 61/243* (2013.01); *B01D 2313/56* (2013.01); *B23P 11/00* (2013.01); *B23P 11/005* (2013.01)

(58) Field of Classification Search
CPC .................. B01D 2313/56; B01D 61/243; B01D 63/021; Y10T 29/49929; B23P 11/00; B23P 11/005
USPC ...... 29/235, 238; 210/321.61, 321.8, 321.87, 210/321.89, 500.23, 321.75, 455, 456; 96/8; 95/45, 52; 422/48; 442/416; 428/398, 399, 192, 184, 182
See application file for complete search history.

(56) References Cited

U.S. PATENT DOCUMENTS 3,846,208 A * 11/1974 McElroy ................. B25B 5/147
156/499
4,138,460 A   2/1979 Tigner
(Continued)

FOREIGN PATENT DOCUMENTS

CH    435693    5/1967
DE  19809501    6/1999
(Continued)

OTHER PUBLICATIONS

DE 102010024976; EPO English Translation; Mueller et al.; Method for Producing Separation Apparatus; Nov. 18, 2018; pp. 1-4.*
(Continued)

*Primary Examiner* — Bayan Salone
(74) *Attorney, Agent, or Firm* — Barnes & Thornburg LLP (57) ABSTRACT

The invention relates to processes for the production of capillary dialyzers. The processes involve thermoforming of bundles of hollow fiber membranes. The disclosure also relates to an apparatus for thermoforming bundles of hollow fiber membranes.

13 Claims, 7 Drawing Sheets

(56) References Cited

U.S. PATENT DOCUMENTS

| | | | | |
|---|---|---|---|---|
| 2004/0183228 A1* | 9/2004 | Stillig | ................ | B01D 63/021 |
| | | | | 264/261 |
| 2011/0195417 A1* | 8/2011 | Ronacher | ................ | B01L 3/502 |
| | | | | 435/6.12 |
| 2014/0349238 A1* | 11/2014 | Luers | ................ | B29B 13/025 |
| | | | | 432/1 |

FOREIGN PATENT DOCUMENTS

| | | | | |
|---|---|---|---|---|
| DE | 19806293 | 8/1999 | | |
| DE | 102010024976 | 5/2011 | | |
| DE | 102010024976 B4 * | 10/2012 | ............. | B29C 39/10 |
| EP | 0261728 | 3/1988 | | |
| EP | 2623284 B1 * | 4/2017 | ........... | B29B 13/025 |
| WO | WO2004/086554 | 10/2004 | | |

OTHER PUBLICATIONS

PCT Search Report and Written Opinion for PCT/EP2015/058219, completed Jun. 23, 2015.

\* cited by examiner

THERMOFORMING OF FIBER BUNDLES

CROSS-REFERENCE TO RELATED APPLICATIONS

This application is the U.S. national phase of PCT/EP2015/058219, filed on Apr. 16, 2015, which claims priority to European Patent Application 14165145.5, filed on Apr. 17, 2014. The disclosures of both European Patent Application 14165145.5 and PCT/EP2015/058219 are hereby incorporated herein by reference in their entireties.

TECHNICAL FIELD

The present disclosure relates to processes for the production of capillary dialyzers. The processes involve thermoforming of bundles of hollow fiber membranes. The present disclosure also relates to an apparatus for thermoforming bundles of hollow fiber membranes.

DESCRIPTION OF THE RELATED ART

U.S. Pat. No. 4,341,005 A discloses a process for the production of hollow fiber fluid fractionation cells which involves placing a series of half sections of the longitudinal walls of the cell on the periphery of a winding wheel; winding fluid-filled permeable hollow fibers thereabout until the section is full or slightly over-full; placing another mating half shell over each fiber-filled section on the wheel and assembling the cell core; cutting the courses between each section and draining the fluid therefrom; putting an initial fluid potting compound about the courses of fibers and centrifugally casting the potting compound about the fibers at each end of the cell; and cutting the fibers at each end within the area of the potting compound to re-expose the hollow cores thereof.

JP 2003/062433 A discloses a method for manufacturing a hollow fiber membrane module capable of efficiently performing the potting of the end part of a hollow fiber membrane bundle without infiltrating a potting agent into the hollow fiber membranes. In this manufacturing method, the hollow fiber membrane bundle is inserted into the cylindrical case so that the end part thereof protrudes from the cylindrical case; the end part is collapsed and sealed to be potted to the opening of the cylindrical case; and the collapsed and sealed part is subsequently cut off.

Another known process involves feeding hollow fibers to a winding wheel and winding these in sleeve lower parts arranged on the outer circumference of the winding wheel by turning the wheel. As soon as the desired fiber bundle thickness or fiber bundle size has been reached, the winding wheel is stopped and the sleeve upper parts are placed on the sleeve lower parts and fixed there. Subsequently, the hollow fibers are cut between the sleeves; the sleeves are removed from the winding wheel and transferred to an apparatus for taking the finished fiber bundles out of the sleeves and placing them into tubular filter casings. Due to the two-part design of the sleeve, the cross-section of the fiber bundle is not a perfect circle; and some fibers tend to get caught in the fissure between the parts. As a result, kinks and loops are generated in some of the fibers when the bundle is transferred into the filter casing, resulting in scrap.

SUMMARY

The present disclosure provides processes for the production of capillary dialyzers comprising a bundle of hollow fiber membranes. The processes involve shaping an end of the fiber bundle to have a circular cross-section and compacting and melting together the fibers on the perimeter of the bundle so that a contiguous annular zone on the perimeter of the bundle is formed.

DETAILED DESCRIPTION

The process for the production of capillary dialyzers involves feeding dry hollow fibers to a winding wheel and winding these in sleeve lower parts arranged on the outer circumference of the winding wheel by turning the wheel. As soon as the desired fiber bundle thickness or fiber bundle size has been reached, the winding wheel is stopped and the sleeve upper parts are placed on the sleeve lower parts and fixed there. Subsequently, the hollow fibers are cut between the sleeves (11); and the sleeves (11) containing a fiber bundle (10) are removed from the winding wheel.

Figure 6:
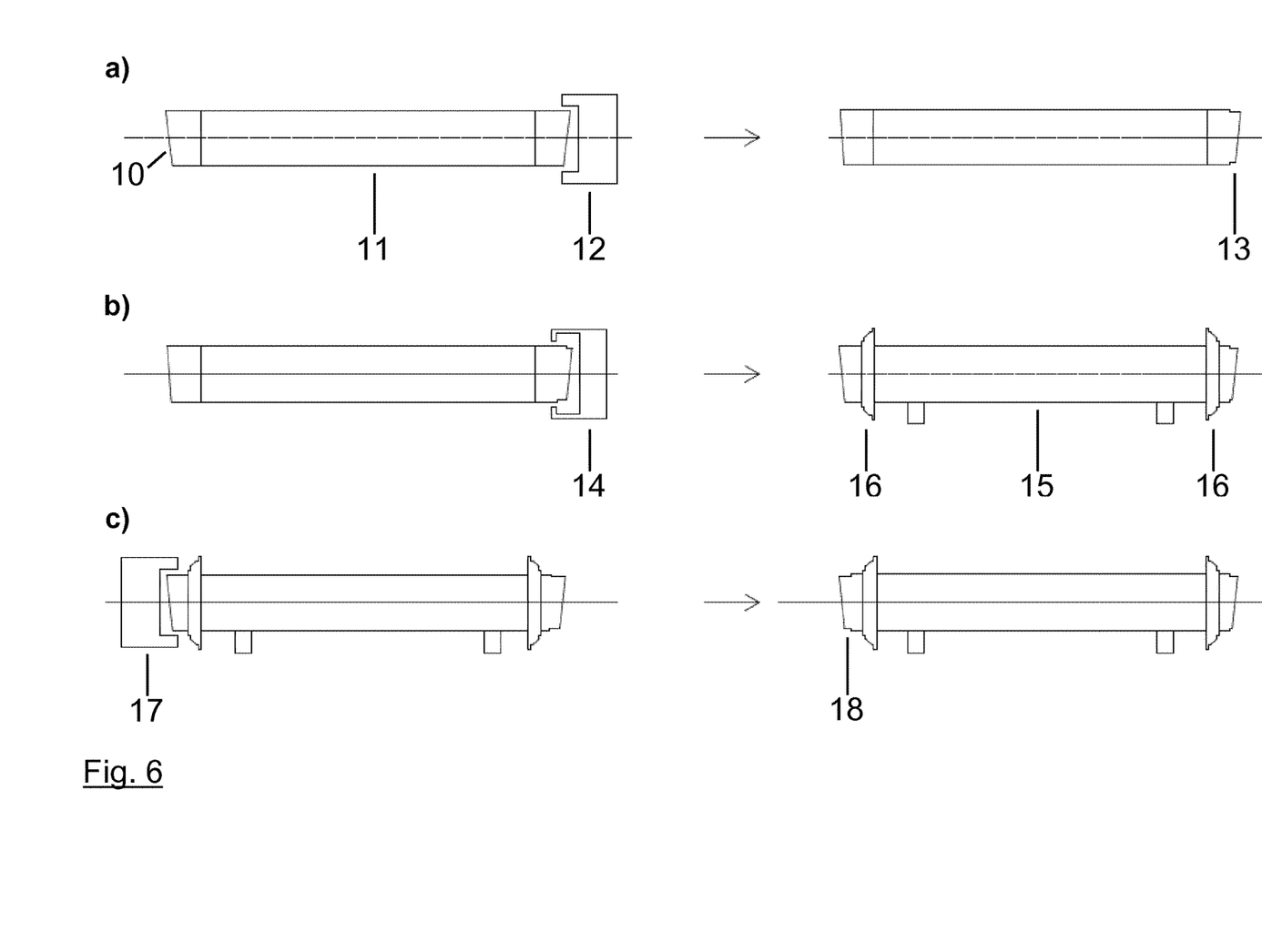
FIG. 6 schematically shows individual steps of the process of the present disclosure:
  a) thermoforming of one end of a fiber bundle;
  b) transfer of the fiber bundle into a tubular filter casing;
  c) thermoforming of the second end of a fiber bundle.

Prior to transfer of a fiber bundle (10) from a sleeve (11) into a tubular filter casing (15), one end of the fiber bundle (10) is reshaped into a circle and the fibers on the perimeter of the fiber bundle are compacted and melted together (this operation is subsequently referred to as "thermoforming") so that a contiguous annular zone (13) is formed on the perimeter of the fiber bundle (10) (FIG. 6a).

In one embodiment of the process, thermoforming is also performed on the second end of the fiber bundle (10). A thermoforming tool (17) produces a contiguous annular zone (18) on the perimeter of the second end of the fiber bundle (10) (FIG. 6c).

In one embodiment of the process, the diameter of the fiber bundle (10) is reduced to from 70 to 90% of its initial value in the contiguous annular zone (13,18) (the thermoformed zone) during thermoforming.

In one embodiment, the contiguous annular zone (13,18) produced by the thermoforming process has a thickness of 0.1 to less than 1 mm, and a length of 2 to 20 mm in longitudinal direction of the bundle.

Figure 1:
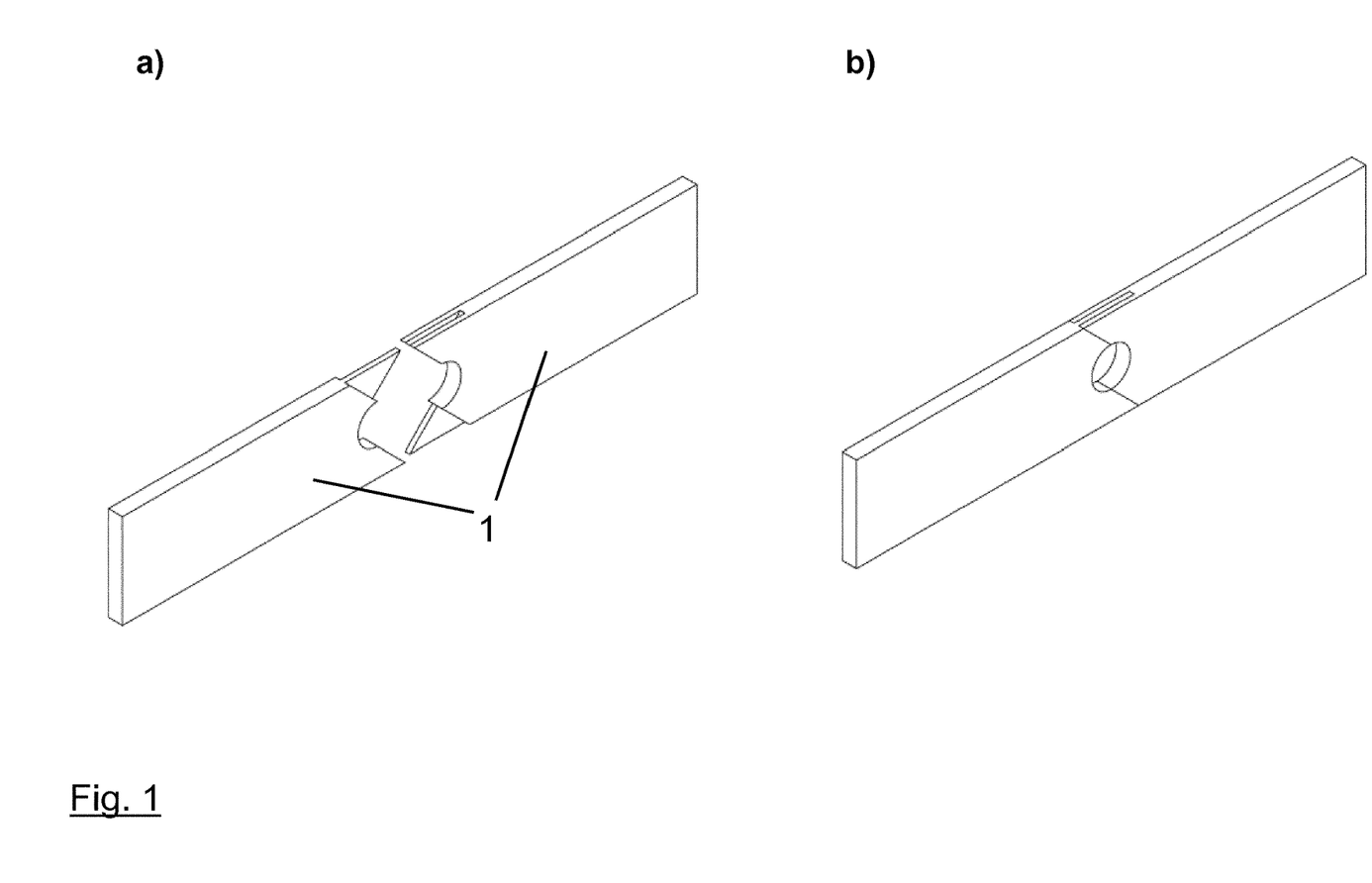
FIG. 1 shows an embodiment of a two-part thermoforming tool a) in open configuration, and b) in closed configuration.
Figure 2:
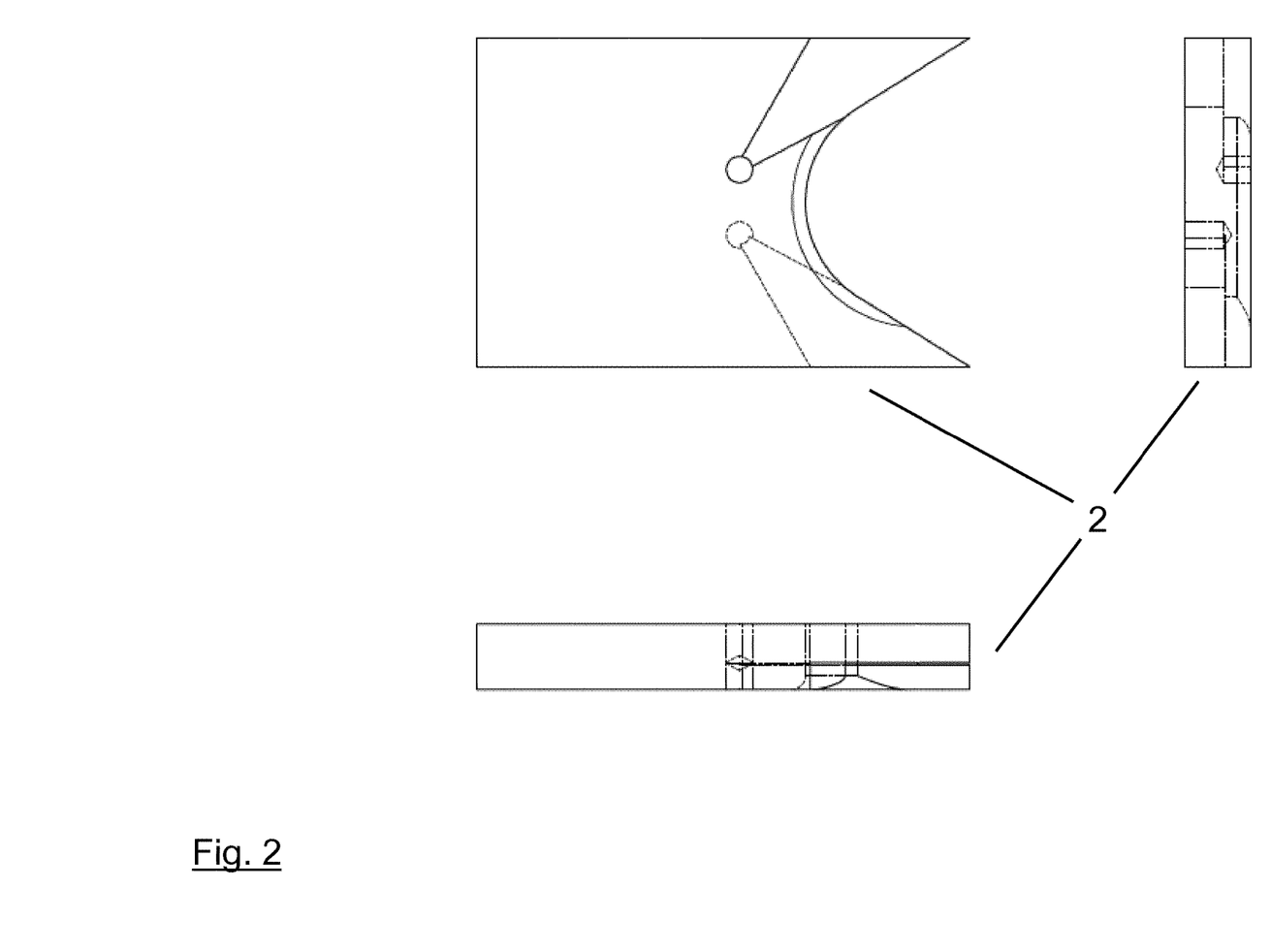
FIG. 2 shows a top view and two side views of an embodiment of an element of a thermoforming tool.
Figure 3:
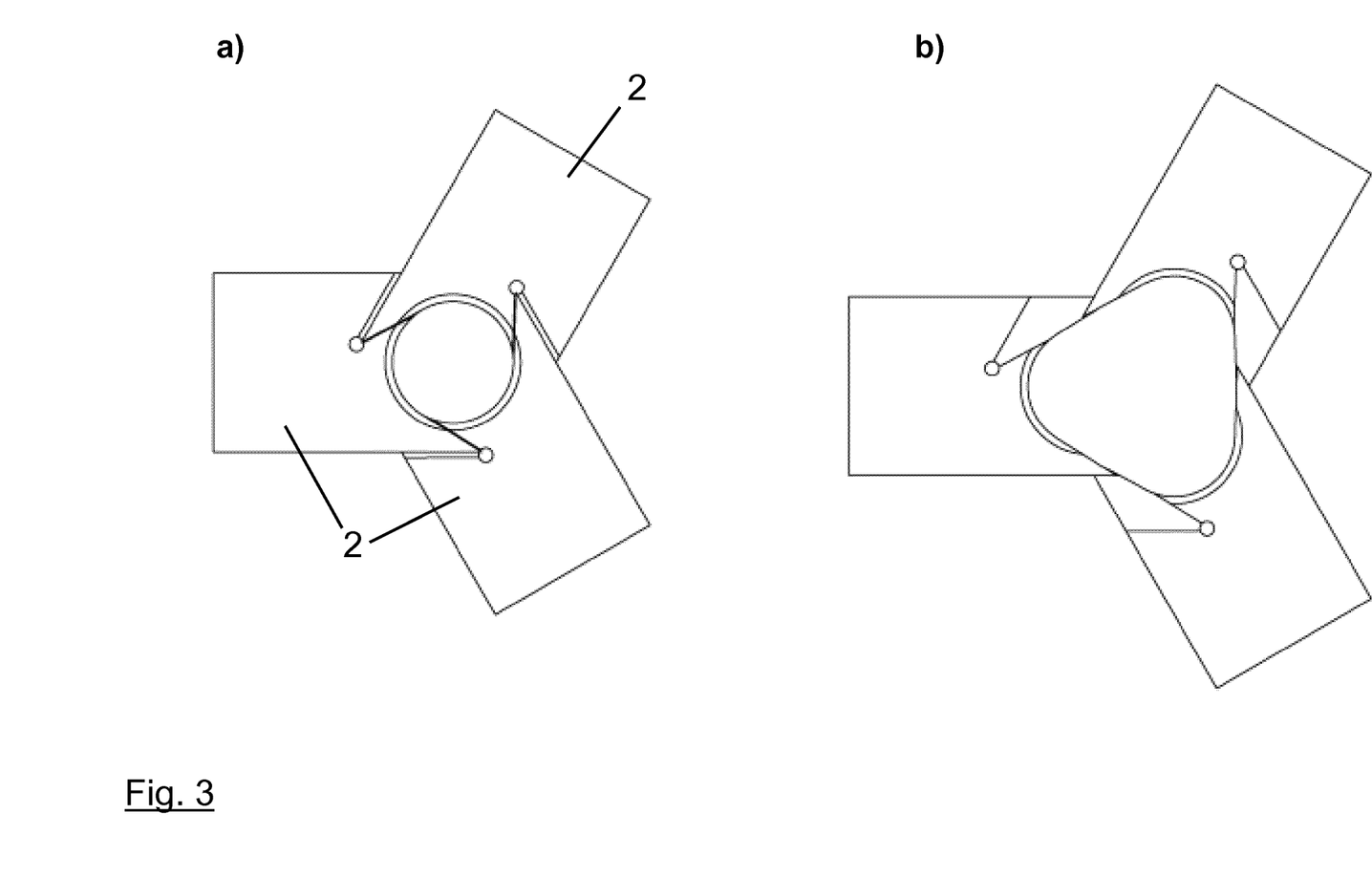
FIG. 3 shows a thermoforming tool comprising three elements pictured in FIG. 2, a) in closed configuration, and b) in open configuration.
Figure 4:
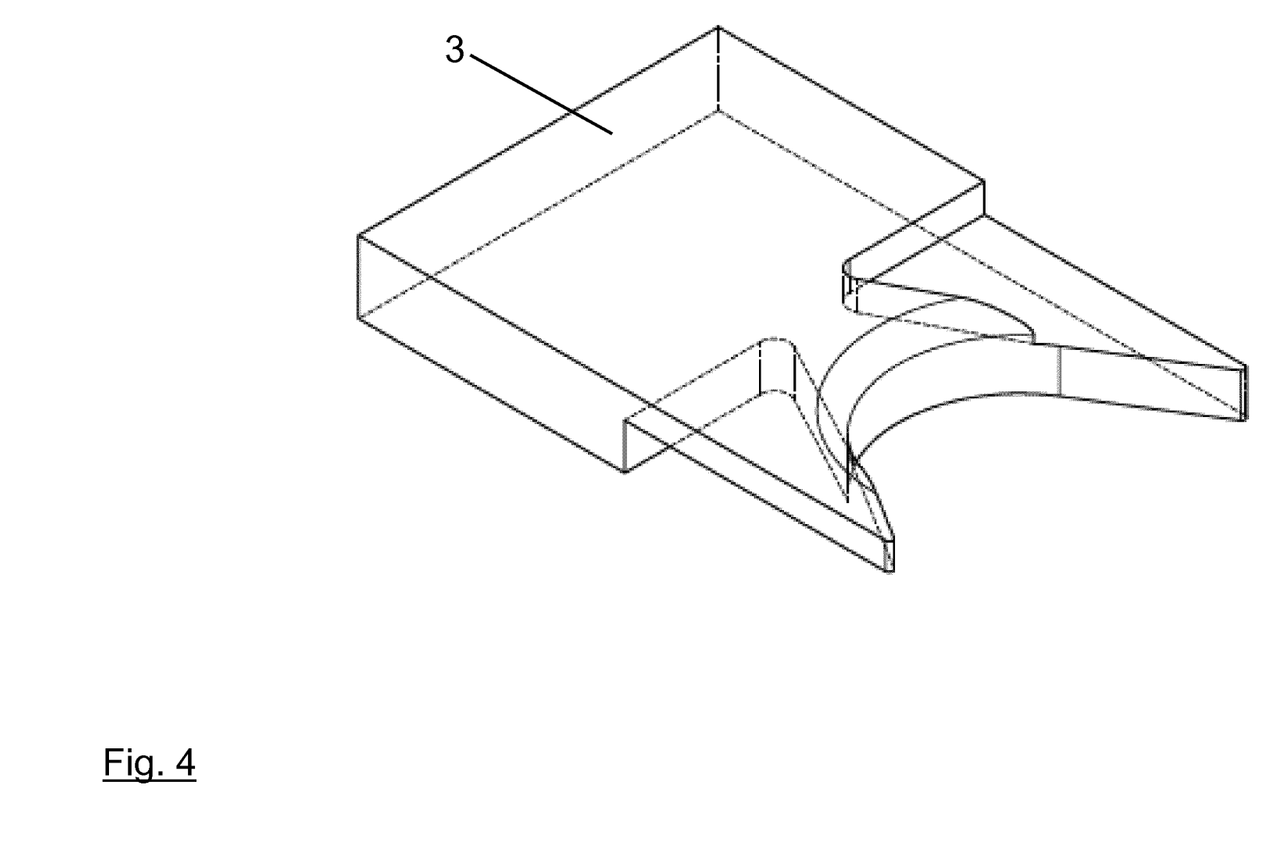
FIG. 4 shows a perspective view of another embodiment of an element of a three-part thermoforming tool.
Figure 5:
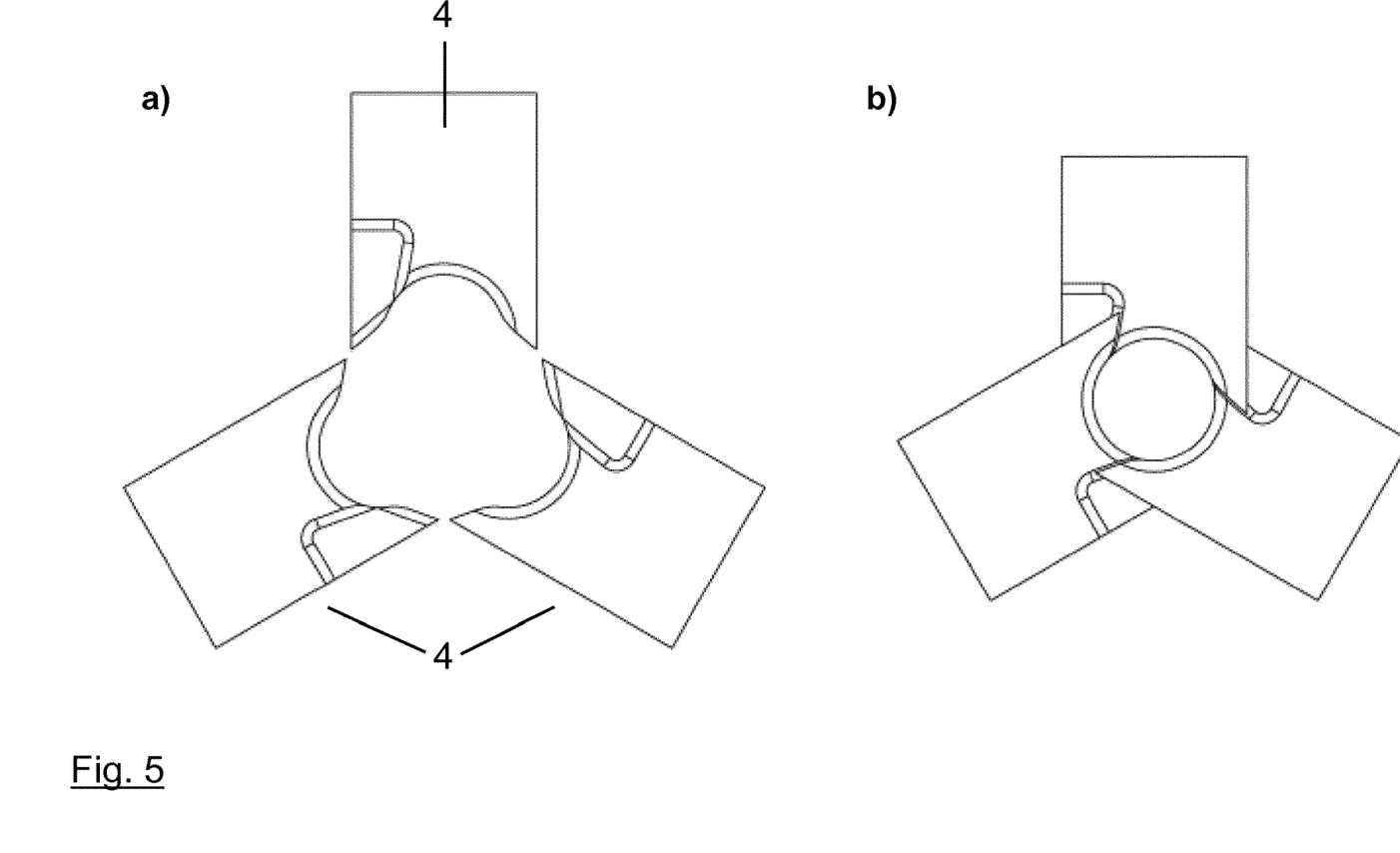
FIG. 5 shows another embodiment of a three-part thermoforming tool a) in open configuration, and b) in closed configuration.

In one embodiment of the process, thermoforming is effected by a two-part tool (thermoforming jaws) as shown in FIG. 1. In another embodiment of the process, thermoforming is effected by a three-part tool (thermoforming jaws) as shown in FIG. 3. In still another embodiment of the process, thermoforming is effected by a three-part tool (thermoforming jaws) as shown in FIG. 5.

In one embodiment, the thermoforming tool (12,17) in closed configuration frames a central void having the form of a cylinder with a diameter in the range of from 15 to 40 mm; and a height in the range of from 5 to 20 mm.

Different exemplary embodiments of individual elements (1,2,3,4) of a thermoforming tool (12,17) for use in the process of the present application are shown in FIGS. 1 to 5.

In one embodiment, the thermoforming tool (12,17) is made of aluminum, and the individual elements (1,2,3,4) are coated with a nonstick coating. In one embodiment, the coating is based on polytetrafluoroethylene (PTFE; Teflon®); in another embodiment, the coating is a silica-based nonstick coating.

The individual elements (1,2,3,4) (also referred to as jaws) of the thermoforming tool (12,17) are heated to a temperature in the range of from about 250° C. to about 300° C. Heating can be effected in different ways known in the art. In one embodiment, the individual jaws (1,2,3,4) feature cavities comprising heating cartridges. In another embodiment, heating elements are provided on a surface of each individual jaw (1,2,3,4). In still another embodiment, a hotplate is arranged on a surface of each individual jaw (1,2,3,4).

To perform the thermoforming and form a contiguous annular zone on the perimeter of the fiber bundle, the heated jaws (1,2,3,4) of the thermoforming tool are moved from a starting position in which they are separated from each other (open configuration) into an end position in which the jaws of the tool contact each other and define a cylindrical central void (closed configuration). Examples are shown in FIGS. 1, 3, and 5. In the closed configuration, the thermoforming tool constricts an end of the fiber bundle (10), shaping its cross-section into a circle with reduced diameter, as compared to the rest of the fiber bundle. The fibers on the perimeter of the fiber bundle (10) are compacted and melted together, thereby forming a contiguous annular zone on the perimeter of the fiber bundle. The jaws (1,2,3,4) remain in their end position for a time in the range of from 3 to 15 seconds, for instance, 5 to 10 seconds, and then are moved back into the starting position.

Thermoforming of a first end of a fiber bundle (10) is schematically shown in FIG. 6a. A thermoforming tool (12) produces a contiguous annular zone (13) on the perimeter of the first end of the fiber bundle (10). The fiber bundle (10) then is transferred into a tubular filter casing (15) (FIG. 6b). In a preferred embodiment, the tubular filter casing (15) is equipped with potting sleeves (16) at both ends. The length of the fiber bundle (10) is greater than the length of the tubular casing (15), so that both ends of the fiber bundle (10) protrude from the tubular casing (15) after the transfer. In particular, the thermoformed zone (13) of the fiber bundle (10) is entirely outside the tubular casing (15).

In one embodiment of the process, the transfer is effected by a transfer tool (14), e.g., a transfer claw, which reaches through the tubular filter casing (15); grabs the thermoformed end (13) of the fiber bundle; and pulls it into the tubular casing (15), continuing to pull until the end of the fiber bundle (10) inclusive of the entire contiguous annular zone (13) protrudes from the tubular casing (15).

The thermoformed end (13) of the fiber bundle (10) simplifies transfer of the fiber bundle (10) into the tubular casing (15). As the position of the fiber ends on the perimeter of the bundle is fixed, and no fibers protrude from the perimeter of the bundle, formation of kinks and loops is avoided. Additionally, the transfer tool (14) does not need to engage all fibers on the perimeter. When the diameter of the thermoformed zone (13) is smaller than the initial diameter of the fiber bundle (10), and also smaller than the inner diameter of the tubular casing (15), the transfer is further facilitated as less force is necessary to pull the fiber bundle (10) into the tubular casing (15). This in turn reduces the risk of fibers rupturing during the transfer of the fiber bundle. Both factors result in reduction of scrap.

In one embodiment of the process, thermoforming is also performed on the second end of the fiber bundle (10) protruding from the tubular casing (15) after transfer of the fiber bundle (10) into the tubular casing (15) (FIG. 6c). A thermoforming tool (17) produces a contiguous annular zone (18) on the perimeter of the second end of the fiber bundle (10).

Figure 7:
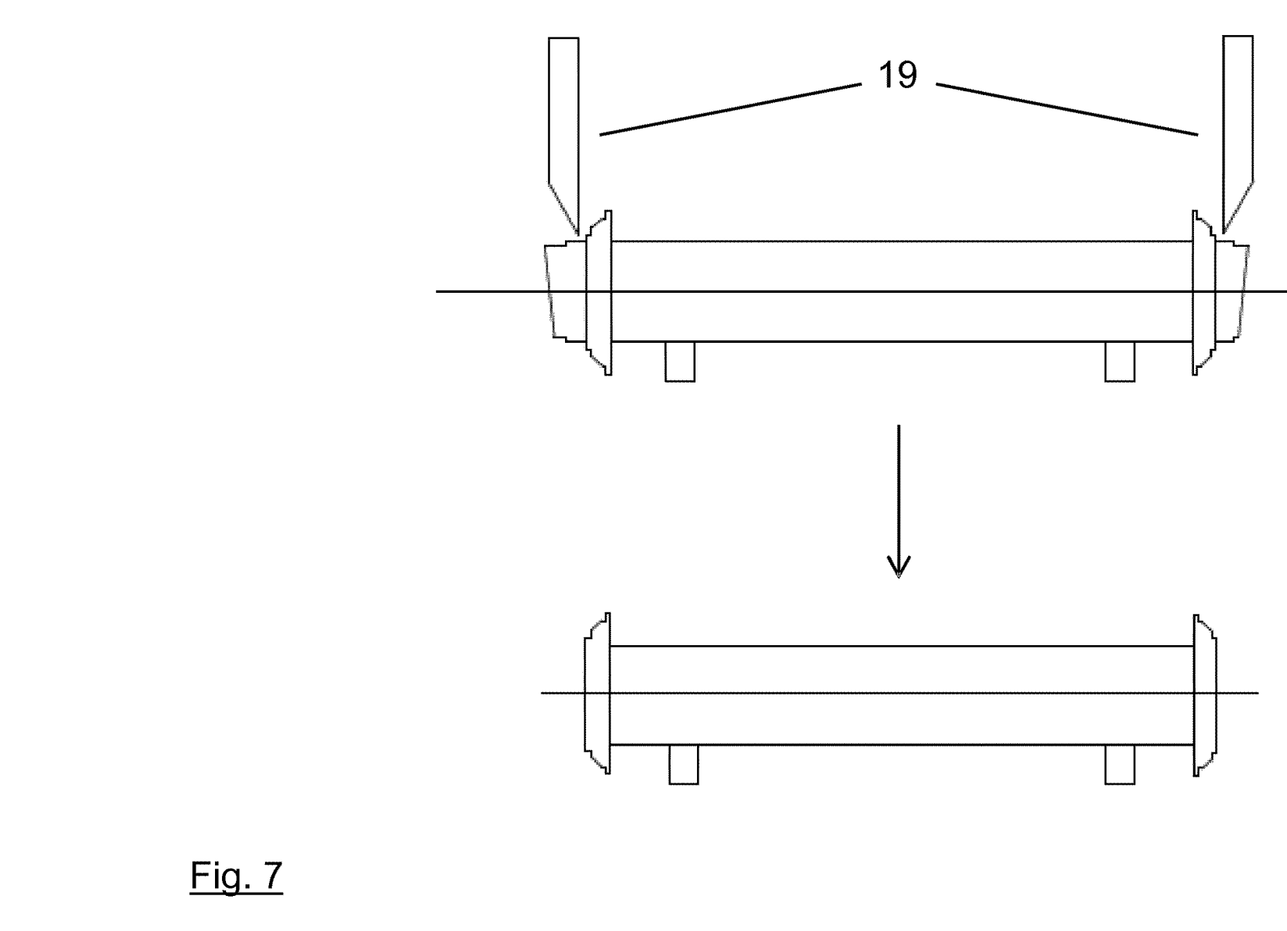
FIG. 7 schematically shows cutting of the ends of the thermoformed fiber bundle.

The portions of the bundle of hollow fiber membranes (10) protruding from the tubular casing (15) are cut off with a cutting tool (19) (FIG. 7) prior to the next stage of the dialyzer production process, which involves the formation of end walls within the tubular casing (15) by embedding the ends of the fiber bundle (10) in a potting material, e.g., polyurethane.

In one embodiment of the process, the end of the fiber bundle (10) is cut off with a blade subsequently to the thermoforming and transfer steps. In another embodiment of the process, the end of the fiber bundle is cut and the fiber ends are heat-sealed with a hot blade or a hot wire subsequently to the thermoforming and transfer steps.

When a thermoformed end of the fiber bundle (10) is cut off, the cut-off forms a contiguous slice, while otherwise a multitude of small fiber pieces is generated. Thus thermoforming also results in less particle generation and less contamination of the workplace and equipment; less maintenance is required in the area where the transfer and cutting steps are performed.

It will be understood that the features mentioned above and those described hereinafter can be used not only in the combination specified but also in other combinations or on their own, without departing from the scope of the present invention.

LIST OF REFERENCE SIGNS 1 first type of element of a thermoforming tool
2 second type of element of a thermoforming tool
3 third type of element of a thermoforming tool
4 fourth type of element of a thermoforming tool
10 bundle of hollow fiber membranes
11 sleeve
12 first thermoforming tool
13 thermoformed first end of the fiber bundle
14 transfer tool
15 tubular filter casing
16 potting sleeve
17 second thermoforming tool
18 thermoformed second end of the fiber bundle
19 cutting tool (e.g., blade, hot blade, or hot wire)

The invention claimed is:

1. A process for the production of a capillary dialyzer comprising a bundle of hollow fiber membranes disposed within a tubular casing, the process comprising the steps of:
 shaping an end of the bundle of hollow fiber membranes to have a circular cross-section; and
 compacting and melting together the fibers on the perimeter of the bundle of hollow fiber membranes to form a contiguous annular zone on the perimeter of the end of the bundle of hollow fiber membranes.

2. The process of claim 1, wherein the contiguous annular zone has a thickness of 0.1 to less than 1 mm.

3. The process of claim 1, wherein the contiguous annular zone has a length of 2 to 15 mm in longitudinal direction of the bundle.

4. The process of claim 1, wherein the diameter of the fiber bundle is reduced to from 70 to 90% of its initial value in the contiguous annular zone.

5. The process of claim 1, wherein a contiguous annular zone is formed on the perimeter of each end of the bundle of hollow fiber membranes.

6. The process of claim 1, wherein the bundle of hollow fiber membranes is transferred into a tubular casing after a contiguous annular zone on the perimeter of one end of the bundle of hollow fiber membranes has been formed.

7. The process of claim 6, wherein the transfer is effected by a tool reaching through the tubular casing; engaging the contiguous annular zone of the bundle of hollow fiber membranes; pulling the bundle of hollow fiber membranes into the tubular casing; and continuing to pull until the end of the bundle of hollow fiber membranes inclusive of the entire contiguous annular zone protrudes from the tubular casing.

8. The process of claim 7, wherein both ends of the bundle of hollow fiber membranes protrude from the tubular casing after the transfer; and the portions of the bundle of hollow fiber membranes protruding from the tubular casing are subsequently cut off.

9. The process of claim 8, wherein a contiguous annular zone is also formed on the perimeter of the second end of the bundle of hollow fiber membranes before the portions of the bundle of hollow fiber membranes protruding from the tubular casing are cut off.

10. The process of claim 8, wherein, simultaneously with cutting off the portions of the bundle of hollow fiber membranes protruding from the tubular casing, the ends of the fibers of the bundle of hollow fiber membranes are heat-sealed.

11. The process of claim 10, wherein cutting off and heat-sealing are performed with a hot blade or a hot wire.

12. An apparatus for forming a contiguous annular zone on the perimeter of an end of a bundle of hollow fiber membranes, comprising movable individual elements which can be arranged into a configuration in which they jointly frame a cylindrical void wherein the cylindrical void is framed by three individual elements.

13. The apparatus of claim 12, wherein the individual elements feature heating elements.

* * * * *